US006928032B2

(12) United States Patent

Plange et al.

(10) Patent No.: US 6,928,032 B2
(45) Date of Patent: Aug. 9, 2005

(54) MECHANISM FOR DISPLAYING THE MOON PHASES

(75) Inventors: Gerd Plange, Schaffhausen (CH); Denis Zimmermann, Kleinandelfingen (CH)

(73) Assignee: Richemont International SA, Villars-sur-Glane (CH)

(*) Notice: Subject to any disclaimer, the term of this patent is extended or adjusted under 35 U.S.C. 154(b) by 0 days.

(21) Appl. No.: 10/688,969

(22) Filed: Oct. 21, 2003

(65) Prior Publication Data

US 2004/0156269 A1 Aug. 12, 2004

(30) Foreign Application Priority Data

Feb. 7, 2003 (EP) ............................................ 03002811

(51) Int. Cl.$^7$ .......................... G04B 19/26; G09B 23/00

(52) U.S. Cl. .......................... 368/18; 434/284; 434/292

(58) Field of Search ...................... 368/15–20; 434/282, 434/284, 291, 292

(56) References Cited

U.S. PATENT DOCUMENTS 4,548,512 A 10/1985 Erard
4,853,908 A * 8/1989 Bourquin et al. ............. 368/19
5,086,416 A * 2/1992 Dubois et al. ................ 368/18
5,475,655 A * 12/1995 Kerr ............................ 368/19

FOREIGN PATENT DOCUMENTS

| | | |
|---|---|---|
| CH | 281 195 | 2/1952 |
| CH | 688 171 | 6/1997 |
| DE | 44 12 702 C1 | 9/1995 |
| EP | 0 107 177 A1 | 5/1984 |
| FR | 2 790 564 | 9/2000 |
| JP | A 60-60580 | 4/1985 |
| JP | B2 1-14551 | 3/1989 |
| JP | A 4-6555 | 1/1992 |
| JP | B2 5-39276 | 6/1993 |
| JP | B2 5-54080 | 8/1993 |
| JP | B2 8-20527 | 3/1996 |

OTHER PUBLICATIONS

Rougnon–Glasson M., "Les Indicateurs de Phases de Lune", La France Horologere, No. 519, Paris, 1991, pp. 68–70.

* cited by examiner

*Primary Examiner*—Vit W. Miska
(74) *Attorney, Agent, or Firm*—Young & Thompson

(57) ABSTRACT

A mechanism for displaying the moon phases which has an upper disc or moon dial (1) and a lower disc or moon indicator (2) that is mounted concentrically to it. One of these discs is mounted rotatably relative to the other. The moon dial (1) has two windows (1*a*, 1*b*) in order to account in the display for the different appearance of the moon phases in the northern and southern hemisphere of the earth.

15 Claims, 6 Drawing Sheets

Figure 1A:
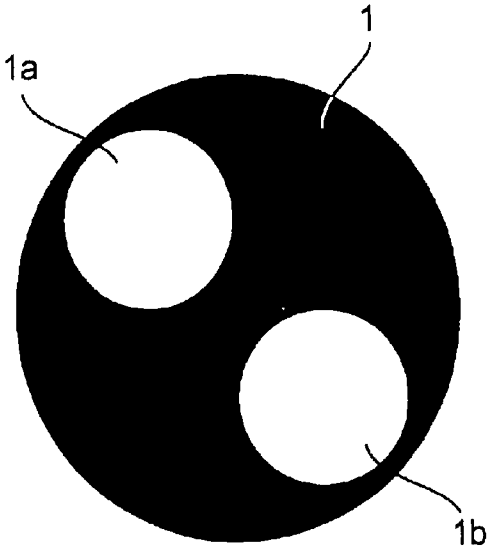

10
1
1a
2a
2
1b
4
2a 2
1
2a
1b
A
1a
4
7
7a
A
2a
5
6
6a
8

9
10
8
1a/b
2
1
3
4
2c
5
6a
6
10
8
9

MECHANISM FOR DISPLAYING THE MOON PHASES

The present invention refers to a mechanism for displaying the moon phases that has an upper disc or moon dial and a lower disc or moon indicator that is concentric to the upper disc, one of these discs being mounted rotatably relative to the other disc. Such mechanisms are available in a multitude of embodiments and are used in particular in complex watches, for instance as one of several secondary displays of these watches. Displays of moon phases most often only reflect one or a few aspects of the complex motions of the moon relative to the earth and sun that lead to the moon phases being observed from the earth. Traditional displays of this kind more particularly lack a realistic representation of the moon phases in their different appearance in the northern and southern hemisphere of the earth, or the moon phases are approximately correctly rendered, only for one of the hemispheres while the moon phases observed in the other hemisphere are not realistically represented.

In this connection it should be noted among other points that the part of the lunar surface illuminated by the sun that is visible to an observer on the earth depends on the relative positions of sun, earth and moon, and that the impression made by this visible part on the observer in addition depends on this observer's position on the earth. This implies, for instance, that depending on his exact position, on the latitude, and on the season, an observer in the northern hemisphere will find the illuminated part of the waxing moon, approximately on the right-hand side of the moon's surface, while an observer in the southern hemisphere will find it on the left-hand side. Exactly the opposite holds true for the waning moon.

It is the aim of the present invention to realize a display of the moon phases which in the display, other than known devices of this kind, accounts for the different appearance of the moon phases in the northern and southern hemisphere of the earth, and which with simple means provides a possibly lifelike picture, both of the position and size of the illuminated and dark part of the lunar surface as seen from the earth.

The mechanism is characterized in particular by a moon dial having two windows in order to account in the display for the different appearance of the moon phases in the northern and southern hemisphere of the earth.

One embodiment of the mechanism is fashioned in such a way that the moon phases in their different appearance in the northern and southern hemisphere of the earth are displayed for both hemispheres simultaneously.

Another embodiment of this mechanism allows the moon phases to be displayed for one of the hemispheres that has been defined in advance, while allowing for the different appearance of the moon phases in the northern and southern hemisphere of the earth.

Further advantages arise from the features cited in the dependent claims as well as from the following description presenting the invention in detail with the aid of drawings.

The appended drawings schematically and by way of example represent some embodiments of a mechanism for displaying the moon phases in accordance with the present invention.

FIGS. 1*a* a to 1*d* schematically illustrate the principles and major components of a first embodiment of such a mechanism having a moon dial with two windows and a graphical arrangement of the moon indicator which is such that the moon phases are indicated simultaneously for the northern and southern hemisphere.

FIGS. 2*a* to 2*d* show different constellations of the moon phase display mechanism of FIGS. 1*a* to 1*d*.

FIGS. 3*a* to 3*d* are analogous to FIGS. 1*a* to 1*d*, while illustrating the principles and major components of a second embodiment of such a mechanism having a moon dial with two windows and a graphical arrangement of the moon indicator which is such that the moon phases are indicated for a particular hemisphere that has been defined in advance.

FIGS. 4*a* to 4*d* show different constellations of the moon phase display mechanism of FIGS. 3*a* to 3*d*.

Figures 5A, 5B, 5C:
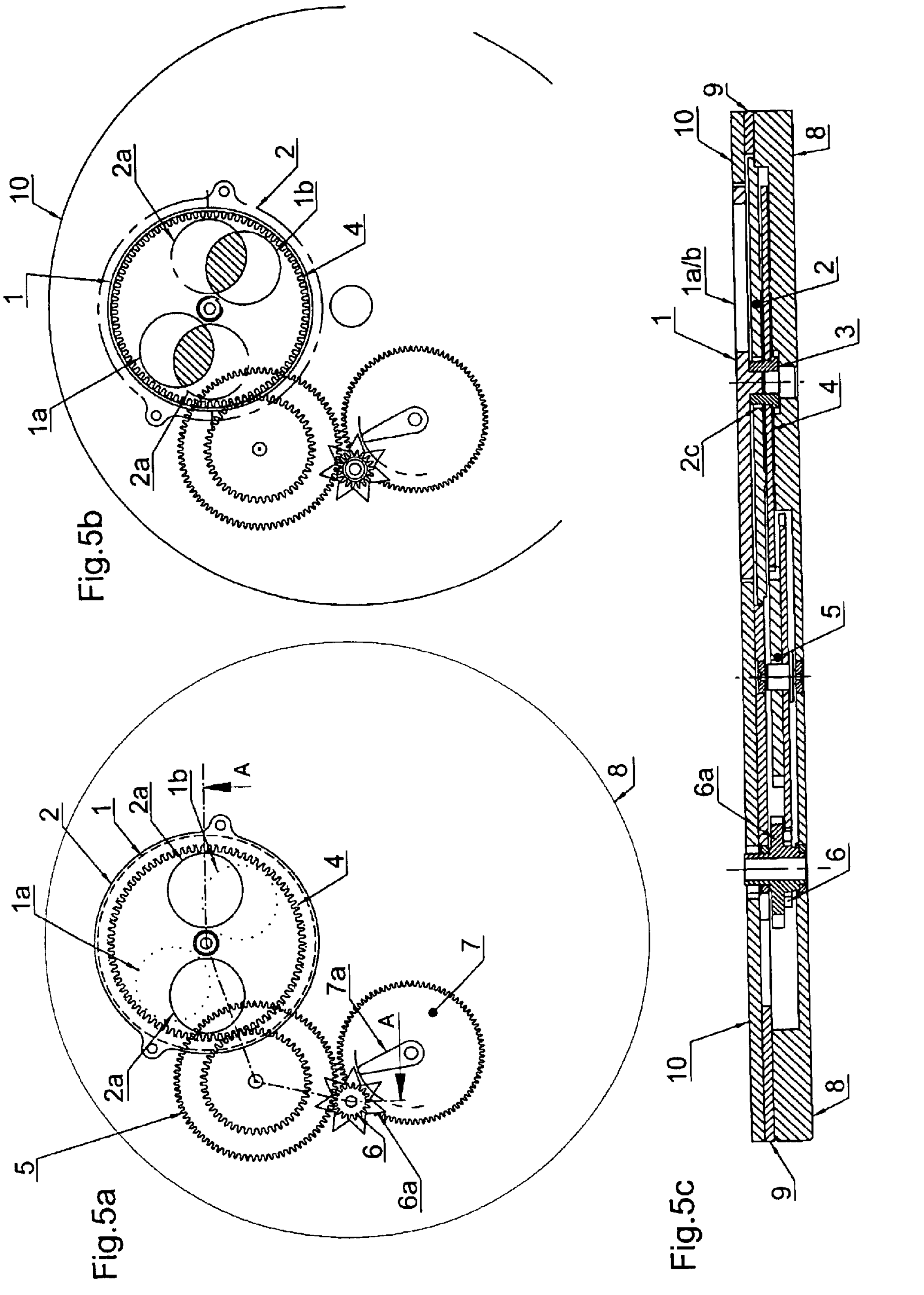

FIGS. 5*a* to 5*c* show an embodiment of the mechanism including an example of the wheel train driving it, in top and sectional views.

Figure 6B:
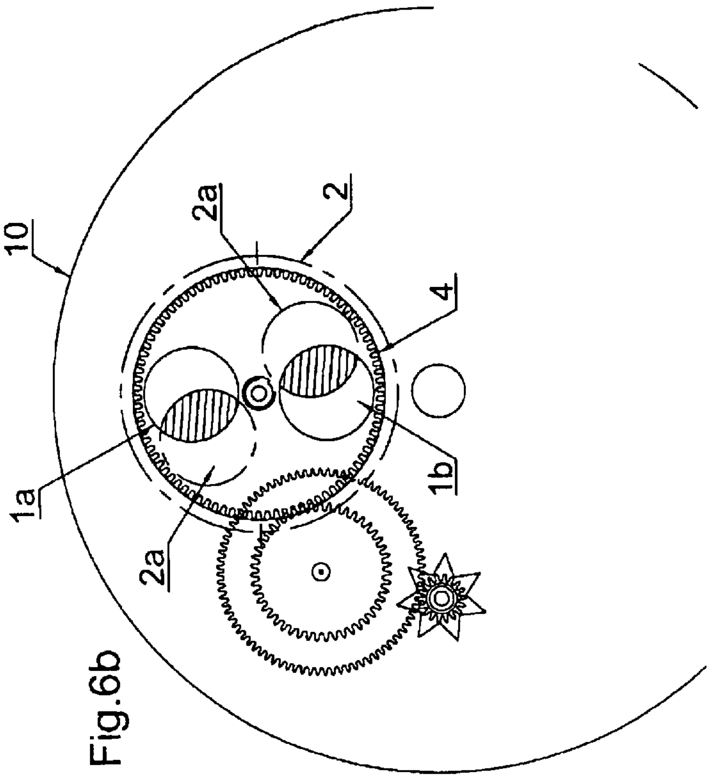
Figure 6A:
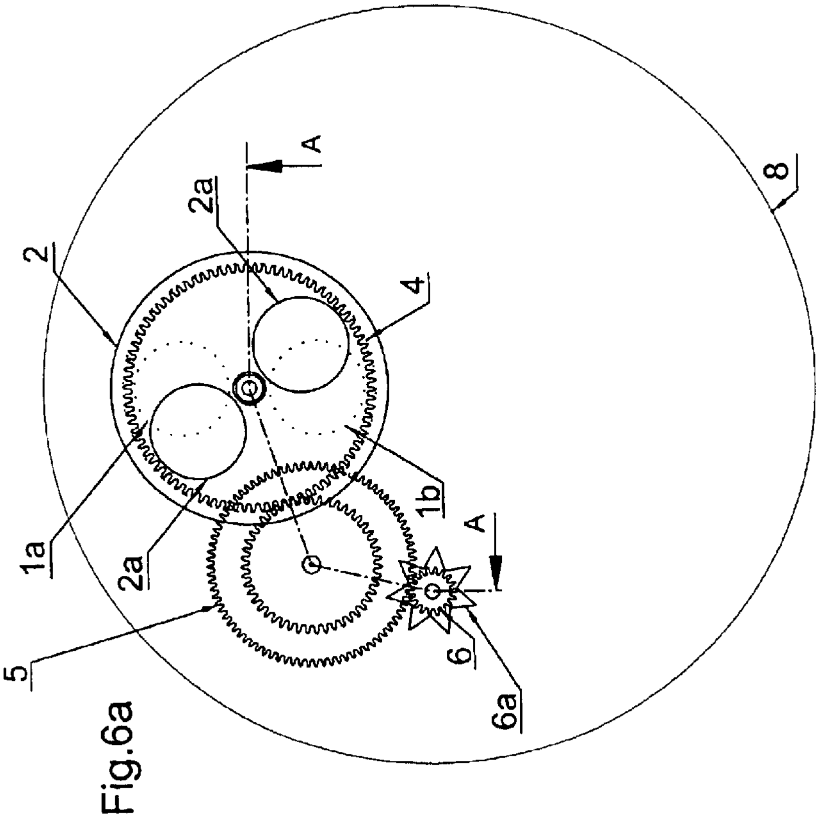
Figure 6C:
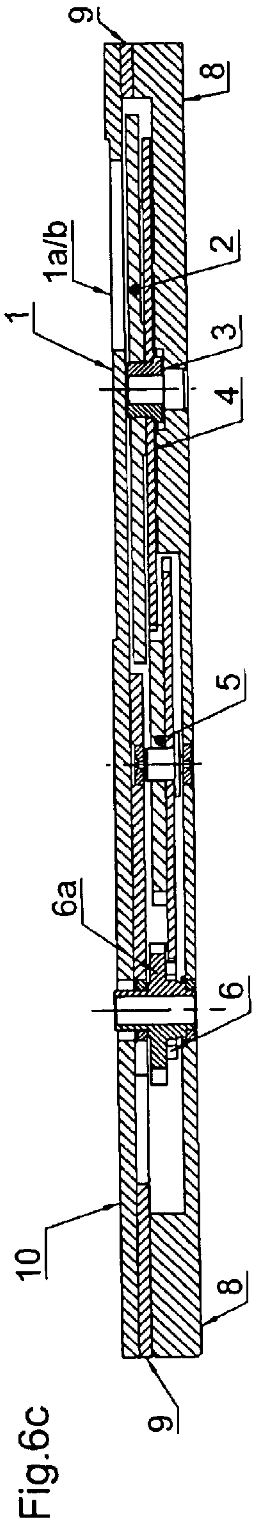

FIGS. 6*a* to 6*c* show a further embodiment of the mechanism including the wheel train driving it, in top and sectional views.

The invention will now be described in detail while referring to the appended drawings.

Using FIGS. 1*a* to 1*d* we shall first describe the major components and the principles of a mechanism in accordance with the present invention.

The mechanism for displaying the moon phases has a first or upper disc, or moon dial 1, in which two windows 1*a* and 1*b* are formed as schematically shown in FIG. 1*a*. Advantageously, these windows are formed so as to display the lunar surface as circular areas which are situated on opposite sides and at the same distance from the centre of the surface of disc 1.

Figure 1B:
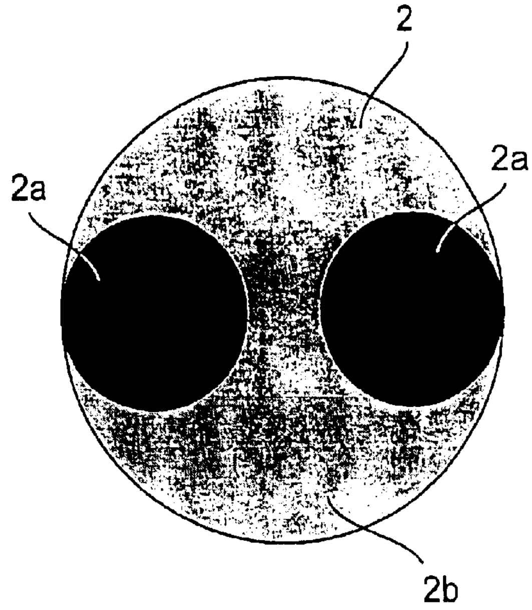

The mechanism further comprises a second or lower disc, or moon indicator 2, represented as an example in FIG. 1*b*. According to the schematic representation in FIG. 1*c*, this moon indicator 2 is placed concentrically beneath the moon dial 1, and functions as it were as a background visible through the windows 1*a* and 1*b* in the moon dial 1. On its face that is turned toward the moon dial 1, therefore, it has a graphical design that is suitable for displaying the moon phases when cooperating with the windows 1*a* and 1*b* of moon dial 1.

This graphical design of the moon indicator 2 generally includes at least one dark region 2*a* representing the part of the lunar surface that is not illuminated, and at least one bright region 2*b* representing the part of the lumar surface that is illuminated. This can be realized with the aid of colours, grades of brightness, or any other means having the same result. In this case the dark region 2*a* can for instance be selected so as to coincide with the upper side of moon dial 1 that is turned away from the moon indicator 1, and is visible for instance on the dial of a watch.

The graphical design of the moon indicator 2 may more particularly comprise two dark circular areas 2*a* having the size of windows 1*a* and 1*b* in the moon dial 1 and set against a bright background 2*b*, as sketched in FIG. 1*b*. Like windows 1*a* and 1*b* of the moon dial 1, these dark circular areas are located on opposite sides of the surface of indicator 2, and also at equal distances from its centre, hence when these dark circular areas 2*a* overlap with windows 1*a* and 1*b*, they are fully visible through these windows.

Figure 1C:
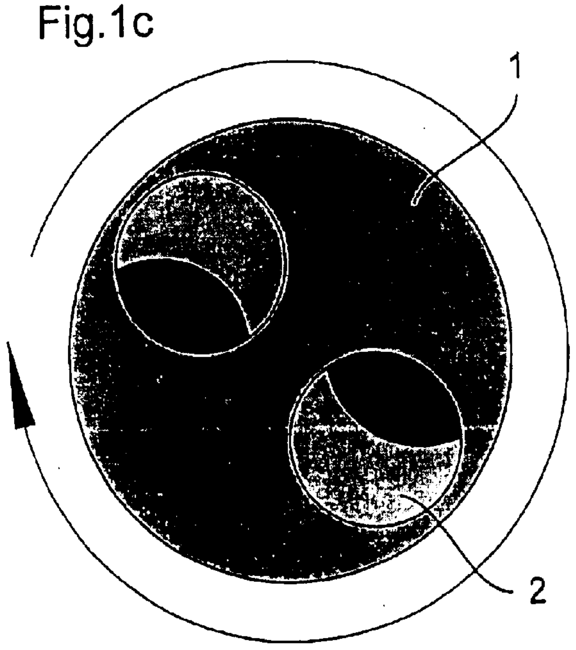

Depending on the relative constellation of the two discs 1 and 2, therefore, a bright segment of a given size becomes visible when these two discs are rotated relative to each other, as seen in FIG. 1*c*, and this segment is supposed to represent the size of the crescent, and thus the moon phase, visible at this point.

Figure 1D:
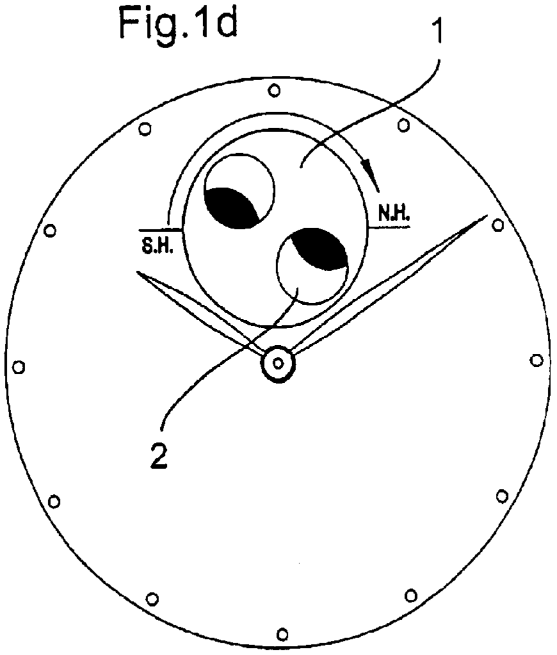
Figures 2A, 2B, 2C, 2D:
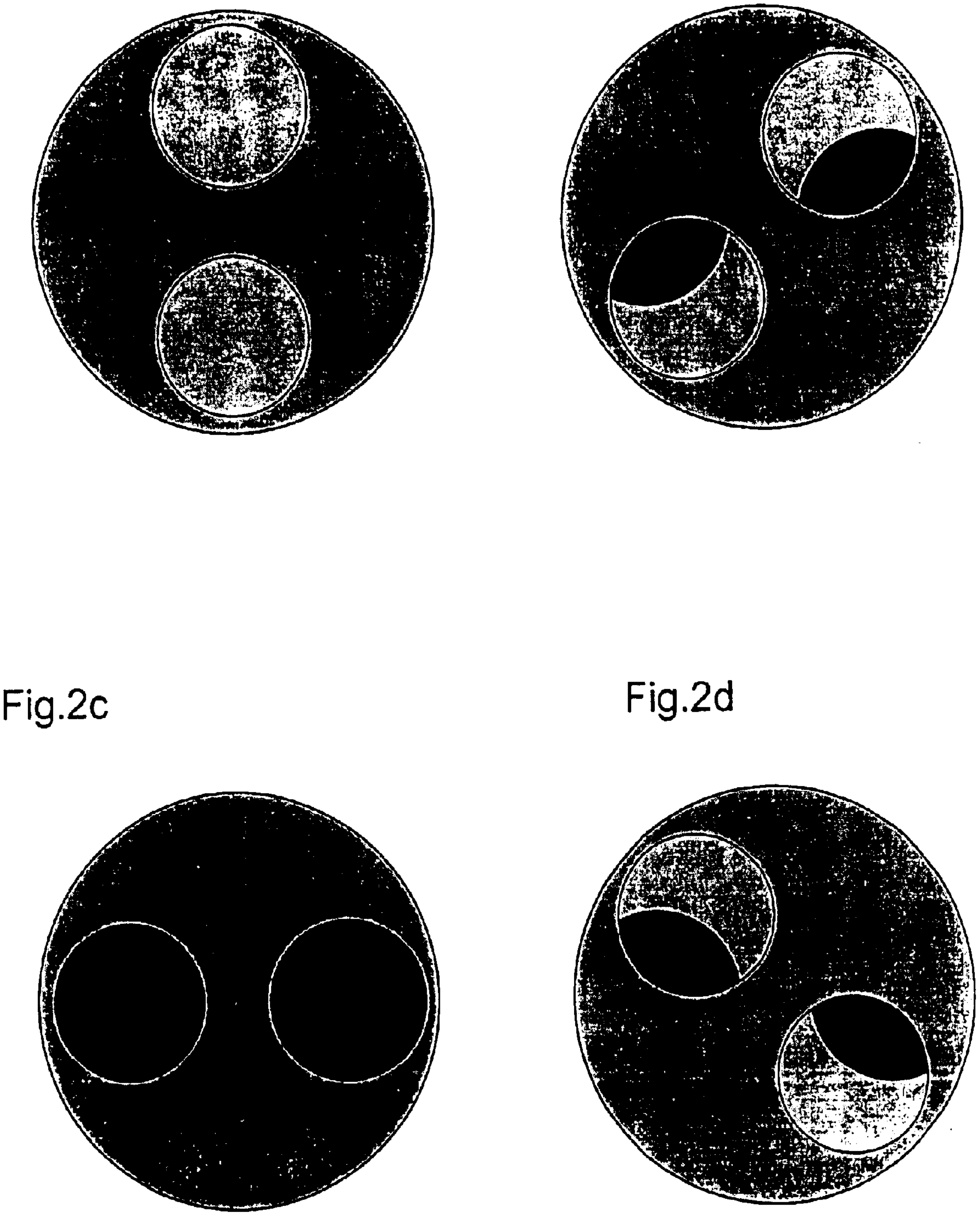

Such a display can among other possibilities be built into a watch, as schematically shown in FIG. 1*d*, where for the purposes of providing an example, the mechanism described is used as a secondary display.

FIGS. 2*a* to 2*d* show by way of example four of the constellations mentioned above, for the relative positions of the two discs 1 and 2, the example selected being that of a background image on the moon indicator 2 according to FIG. 1*b*. It can be seen when assuming that the moon dial 1 is turned clockwise above the stationary moon indicator 2, as shown by an arrow in FIGS. 1*c* and 1*d*, that the different moon phases from a full moon (FIG. 2*a*) via a waning moon (FIG. 2*b*) and a new moon (FIG. 2*c*) up to a waxing moon (FIG. 2*d*) are reproduced. It must be noted in particular here that it is possible with this embodiment of the mechanism having the two windows 1*a* and 1*b* of the moon dial 1 and a corresponding design of the background on the moon indicator 2, to represent the moon phases simultaneously for the northern and southern hemisphere, and as explained at the outset, in doing so to come close to reality with respect to the position of the illuminated part of the moon's surface. That is, the upper half of the moon phase display shows the moon phases in approximately the way in which they are visible from the northern hemisphere of the earth, while in the lower half their appearance is shown as seen from the southern hemisphere. For a simpler interpretation by the user, an aid to orientation can be shown on the dial of a watch, as shown in FIG. 1*d*, for instance in the shape of two short horizontal lines representing the equator and/or with an appropriate text, symbol or pictogram.

The graphical design of the moon indicator 2 can be subject to numerous changes without touching on the function of moon indicator 2 or on the basic idea of the present invention. For instance, the position, size, colour etc. of the corresponding regions in disc 2 can be altered, generally even their shape. One of many conceivable alternatives for the graphical design of moon indicator 2 is shown by way of example in FIGS. 3*a* to 3*d* and FIGS. 4*a* to 4*d*, which are analogous to the FIGS. 1*a* to 1*d* and 2*a* to 2*d* explained above.

In this case the graphical design of moon indicator 2 consists of a dark region and a bright region in moon indicator 2, the two regions being delimited against each other by two arched separating lines having a radius that corresponds to the size of windows 1*a* and 1*b* of the moon dial 1. The background on the surface of moon indicator 2 is thus divided into a bright half and a dark half, and the dark region is expanded on each side to the left and right of the centre of disc 2 by a semicircle corresponding to the size of windows 1*a* and 1*b*, as can be seen from FIG. 3*b*.

Figure 3A:
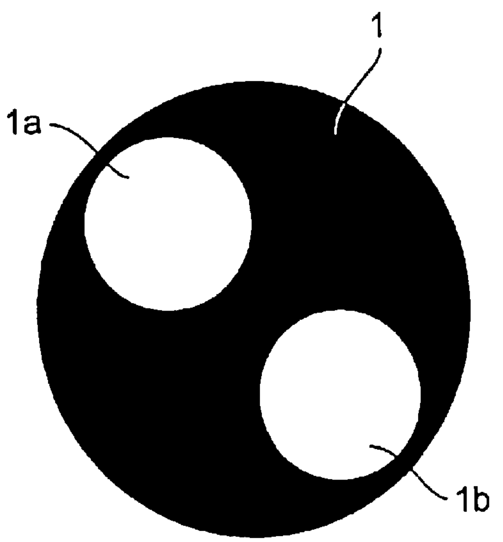
Figure 3B:
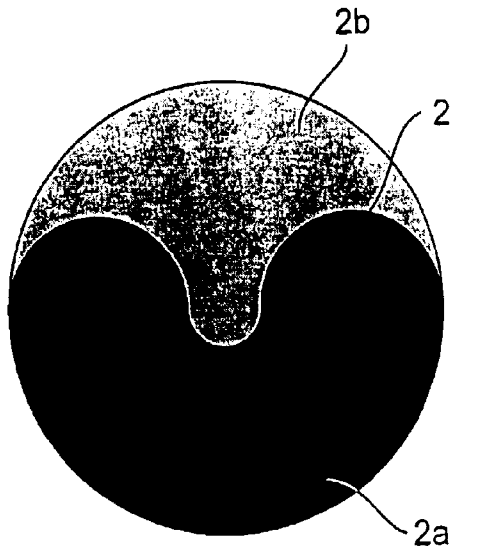
Figure 3C:
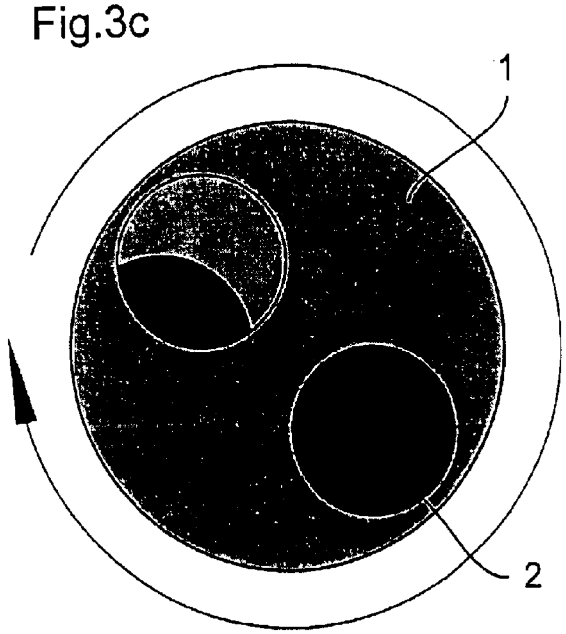
Figure 3D:
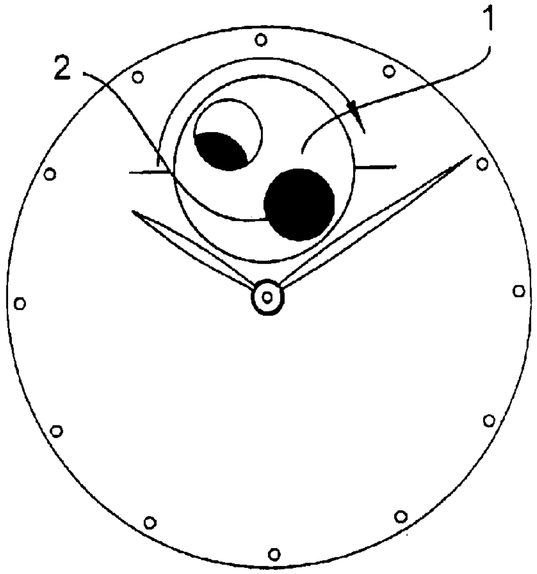
Figure 4A:
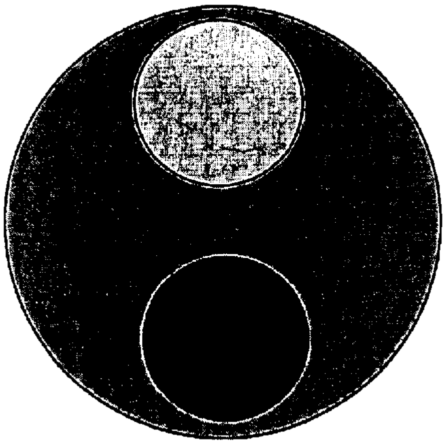
Figure 4B:
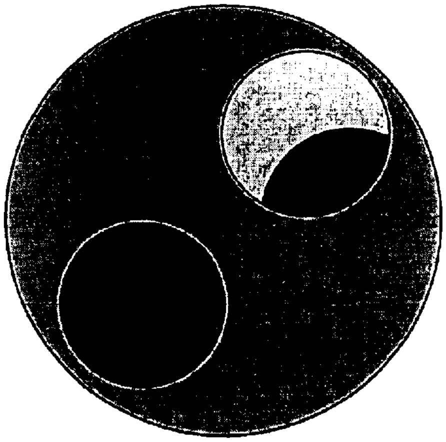
Figure 4C:
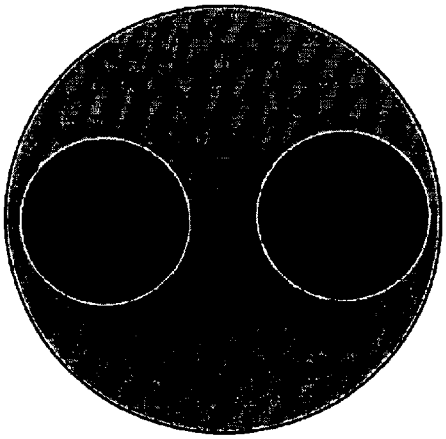
Figure 4D:
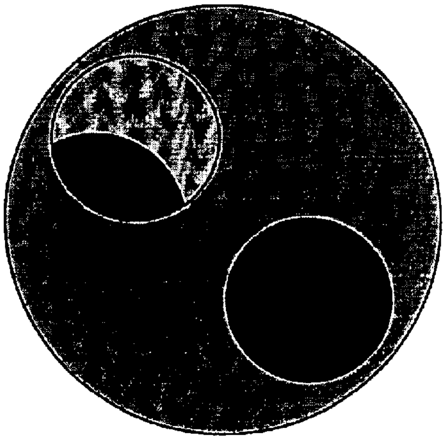

FIGS. 4*a* and 4*b* reproduce four associated constellations appearing during a relative rotation of the two discs 1 and 2 for a background image on the moon indicator 2 in accordance with FIG. 3*b*; they are self-evident. Assuming clockwise rotation of the moon dial 1 above the stationary moon indicator 2, as indicated by an arrow in FIGS. 3*c* and 3*d*, the different moon phases from a full moon (FIG. 4*a*) via a waning moon (FIG. 4*b*) and a new moon (FIG. 4*c*) up to a waxing moon (FIG. 4*d*) are shown as seen from the northern hemisphere of the earth. With this second embodiment of the mechanism, and because of the two windows 1*a* and 1*b* of the moon dial 1 as well as the background design that was described for moon indicator 2, it it possible therefore to reproduce the moon phases for a given, predefined hemisphere in a way that is close to reality with respect to the position of the illuminated part of the moon's surface; the case sketched is that of the northern hemisphere. With a change of the image on the moon indicator 2, for instance by mirroring of the image about a horizontal line, one could indicate the moon phases approximately in the way in which they are visible from the southern hemisphere of the earth. This would also be possible by a moon dial 1 rotating in the other direction. Since it is only the relative position of discs 1 and 2 that matters, it will of course also be possible to realize these two cases with a stationary moon dial 1 and a rotated moon indicator 2; this holds analogously for the first embodiment.

FIGS. 5*a* to 5*c* show an embodiment of the mechanism including an example for the wheel train driving it, in views from above and in section. In this embodiment the moon dial 1 with the two windows 1*a* and 1*b* rotates above the stationary moon indicator 2 which, in order to provide a specific example, has the graphical design sketched in FIG. 1*b*.

Here the mechanism is integrated into a watch with perpetual calendar, which is an obvious example, even though not all the components matter for the moon phase display mechanism, and hence are not reflected in the figures. In FIG. 5*b* a top view is shown where parts situated beneath a dial 10 of the watch are indicated in dash-dotted lines, while FIG. 5*a* is a view without the dial where the moon dial 1 with the two windows 1*a* and 1*b* is indicated in dashed lines.

A 24-hour wheel 7 performing one revolution in 24 hours carries a finger 7*a* driving the day star wheel 6*a* mounted on a day wheel 6. This then is advanced once a day by one tooth, normally about midnight and clockwise. The day wheel 6 in turn drives a moon indicator wheel 4 via a moon phase intermediate wheel 5. It can be seen more particularly from FIG. 5*c* representing a section along the line A—A in FIG. 5*a* that in this embodiment, the moon indicator wheel 4 and the moon dial 1 are solidly connected by a shaft 3 in such a way that they turn in synchronization. The moon dial 1 is at the same level with dial 10 within which it represents a kind of rotating element. The moon indicator 2 is located at a safe distance between the moon indicator wheel 4 and the moon dial 1. In its centre, it has a hole 2*c* serving as a passage for said shaft 3. The moon indicator 2 is attached with two fasteners for instance to a plate 8, as shown in FIGS. 5*a* and 5*b*, and functions as a kind of extension of a bridge 9 so that the assembly of moon indicator wheel 4, shaft 3 and moon dial 1 can be mounted rotatably on plate 8 while surrounding the moon indicator 2 with slight play.

The 24-hour wheel 7 which was mentioned above and which drives the day star wheel 6*a*, can in turn be driven by the dial train via an hour wheel not shown here which performs one revolution in 12 hours.

As an alternative to driving the day star wheel 6*a* via the 24-hour wheel 7, this can also be realized by a switching lever which once a day about midnight advances the day star wheel 6*a* by one tooth, or by similar means sufficiently well known in the context of complex watches. Generally, the mechanism for displaying the moon phases can be fitted without problems into other clockwork modules of a watch.

In this embodiment of the mechanism, the moon dial 1 every day is rotated through a particular angle. This angle depends on the rate of rotation selected for the moon dial 1, which in turn must be selected as a function of graphical design of the moon indicator 2, inasmuch as depending on the size of the windows in moon dial 1, even four dark circular areas or some number other than two such areas might for instance be placed on the moon indicator. This rate of rotation is set via a suitable reduction gear between the day star wheel 6*a* and the moon indicator wheel 4. In the following, its calculation will be explained in more detail in the instance of the two variants of graphical design of the moon indicator 2 which had been explained in detail above; for other variants, this would have to be changed accordingly. The reduction between day star wheel and moon indicator wheel shown in the figures has in this case a value of 7:18×83:47×86:2=29.53073, as given by the number of teeth of the wheels 6*a*, 6, 5 and 4 that are involved, and by the number of dark circular areas 2*a*. Thus, to simulate a lunar period, the moon dial 1 performs half a revolution in 29.53073 days, that is, it rotates by about 6.1° per day. The resulting error relative to the synodic period of the moon thus amounts to 29.53073 days−29.53059 days=0.00014 days, which referred to a year is a deviation of 0.00173 days, equivalent to one day in about 578 years.

Since the assembly of moon indicator wheel 4, shaft 3 and moon dial 1 rotates once in about 59 days about itself, therefore, in the present embodiment the surface of the moon indicator 2 with its background image which is turned toward the moon dial 1 above it becomes visible in succession through the two windows 1*a* and 1*b*, hence the moon phase being observed at any given time is represented on dial 10, just as explained by way of example while referring to FIGS. 2*a* to 2*d* and 4*a* to 4*d*, respectively.

FIGS. 6*a* to 6*c* show an embodiment of the mechanism including the wheel train driving it, in views from above and in section. In this embodiment the moon dial 1 with the two windows 1*a* and 1*b* is stationary while the moon indicator 2 rotates beneath this dial 1.

It can be seen more particularly from FIG. 6*c* that in this case the moon dial with the two windows 1*a* and 1*b* and the watch dial 10 may form a single part. In contrast to the mechanism described above, here the moon indicator 2 is solidly attached to shaft 3 and forms an assembly with the moon indicator wheel 4. The relative motion that is required between the moon dial (which here is integrated into the watch dial 10) and the moon indicator 2 is now realized by rotation of the latter. It can be seen from FIGS. 6*a* and 6*b* that in this case the two windows 1*a* and 1*b* can advantageously be arranged along a vertical line, but in analogy to the two dark circular areas 2*a* on the moon indicator 2 in the earlier embodiment, they can also be arranged in a different position or with a different inclination. The direction of rotation can be adapted to the constellation to be represented, as explained earlier on. In this embodiment, the direction of rotation of moon indicator 2 in particular must be the opposite of the direction of rotation of moon dial 1 in the embodiment described before, in order to attain the same display constellation.

The mechanism for displaying the moon phases according to the present invention makes it possible, therefore, to display the moon phases while allowing for the difference between the hemispheres of the earth that is visible for an observer on the earth.

This objective is attained in a simple and efficient way, and the invention can be used in a versatile fashion, so in perpetual calendars of watches, indicator panels and the like.

The main advantage of this mechanism consists in the possibility to display the moon phases separately in lifelike fashion, and in the first embodiment, simultaneously for the northern and southern hemisphere. This embodiment moreover is highly exclusive in its design, insofar as the rotating representation of the moon phase through rotating moon display windows constitutes an advantageous contrast to the conventional representation through a stationary window in the watch dial in which a rotating background disc becomes visible. Further, few limits exist with respect to the multitude of representations available for the moon phases by different designs of the fixed background. Moreover, this is realized very simply, economically and efficiently by the mechanism according to the invention.

What is claimed is:

1. Mechanism for displaying the moon phases with an upper disc or moon dial (1) and a lower disc or moon indicator (2) mounted concentrically to it, with one of these discs being mounted rotatably relative to the other, characterized in that the moon dial (1) has two windows (1*a*, 1*b*) in order to allow for the different appearance of the moon phases in the northern and southern hemisphere of the earth, and wherein the two windows (1*a*, 1*b*) are both arranged so as to be continuously and simultaneously visible.

2. Mechanism according to claim 1, characterized in that it is arranged in such a way that the moon phases are displayed simultaneously for both hemispheres while allowing for their different appearance in the northern and southern hemisphere of the earth.

3. Mechanism according to claim 1, characterized in that it is arranged in such a way that the moon phases are displayed for one hemisphere while allowing for their different appearance in the northern and southern hemisphere of the earth.

4. Mechanism according to claim 1, characterized in that the moon indicator (2) has a graphical design on its surface turned toward the moon dial (1) which in cooperation with the windows (1*a*, 1*b*) of the moon dial (1) is adapted to display the moon phases.

5. Mechanism according to claim 4, characterized in that the graphical design of the moon indicator (2) comprises at least one dark region (2*a*) representing the part of the moon's surface that is not illuminated, and at least one bright region (2*b*) representing the illuminated part of the moon's surface.

6. Mechanism according to claim 5, characterized in that the graphical design of the moon indicator (2) comprises two dark circular areas having the size of the windows (1*a*, 1*b*) of the moon dial (1) as well as a bright background.

7. Mechanism according to claim 5, characterized in that the graphical design of the moon indicator (2) comprises a dark region and a bright region delimited against each other by two arched separating lines having a radius that corresponds to the size of the windows (1*a*, 1*b*) of the moon dial (1).

8. Mechanism according to claim 1, characterized in that the windows (1*a*, 1*b*) of the moon dial (1) are arranged on opposite sides of and at equal distances from the centre of this dial.

9. Mechanism according to claim 1, characterized in that a moon indicator wheel (4) and the moon dial (1) are attached to a shaft (3) so that they rotate in synchronization while the moon indicator (2) is stationary.

10. Mechanism according to claim 1, characterized in that a moon indicator wheel (4) and the moon indicator (2) are attached to a shaft (3) so that they rotate in synchronization while the moon dial (1) is stationary.

11. Mechanism according to claim 9, characterized in that a day star wheel (6*a*) mounted on a day wheel (6) and passing on the drive power is advanced once a day by one tooth, such that the day wheel (6) drives the moon indicator wheel (4) via a moon phase intermediate wheel (5).

12. Watch, characterized in that it comprises a mechanism for displaying the moon phases according to claim 1.

13. A mechanism for displaying moon phases comprising an upper moon dial mounted concentrically above a lower moon indicator, wherein one of the upper moon dial and the lower moon indicator is mounted rotatably relative to the other, and wherein the mechanism enables the moon phases for both the northern and southern hemisphere of the earth to be displayed simultaneously while allowing for the different appearance of the moon phase in each hemisphere.

14. A mechanism according to claim 13 wherein the upper moon dial has two windows formed therewithin.

15. A mechanism for displaying moon phases comprising an upper moon dial mounted concentrically above a lower moon indicator, wherein one of the upper moon dial and the lower moon indicator is mounted rotatably relative to the other, wherein the upper moon dial has two windows formed therewithin, both of said windows being continuously and simultaneously visible, and wherein the mechanism enables the moon phase to be displayed for only one of the northern and southern hemisphere of the earth while allowing for the different appearance of the moon phase in the hemisphere for which the moon phase is being displayed.

* * * * *